United States Patent [19]
Chiba et al.

[11] Patent Number: 5,811,501
[45] Date of Patent: Sep. 22, 1998

[54] PROCESS FOR PRODUCING UNSATURATED GROUP-TERMINATED ISOBUTYLENE POLYMER

[75] Inventors: Takeshi Chiba; Hiroshi Fujisawa, both of Hyogo; Yoshimichi Yamanaka, Osaka; Yoshikuni Deguchi; Kazuya Yonezawa, both of Hyogo, all of Japan

[73] Assignee: Kanegafuchi Kagaku Kogyo Kabushiki Kaisha, Osaka, Japan

[21] Appl. No.: 671,198

[22] Filed: Jun. 27, 1996

[30] Foreign Application Priority Data

Jun. 29, 1995 [JP] Japan ................................. 7-185032

[51] Int. Cl.$^6$ ................................. C08F 2/06; C08F 10/10
[52] U.S. Cl. ...................... 526/216; 526/135; 526/146; 526/147; 526/194; 526/204; 526/209; 526/210; 526/212; 526/217; 526/220; 526/221; 526/222; 526/237; 526/348.7; 525/267; 525/270; 525/288; 525/918; 528/501
[58] Field of Search ................. 526/216, 348.7, 526/237, 221, 194, 135, 146, 147, 204, 209, 210, 212, 217, 220, 222; 525/267, 270, 288, 918; 528/501

[56] References Cited

U.S. PATENT DOCUMENTS

| | | | |
|---|---|---|---|
| 3,493,549 | 2/1970 | Uemura et al. | 526/237 X |
| 5,247,021 | 9/1993 | Fujisawa et al. | 526/221 X |
| 5,527,870 | 6/1996 | Maeda et al. | 526/348.7 X |

*Primary Examiner*—Fred Teskin
*Attorney, Agent, or Firm*—Armstrong, Westerman, Hattori, McLeland & Naughton

[57] ABSTRACT

The present invention provides a novel halogen-free solvent system which can produce a good isobutylene polymer and can be easily reused. A novel process for the production of an isobutylene polymer is provided which comprises using a hydrocarbon solvent having a boiling point of not lower than 105° C. and a melting point of not higher than −90° C. Heretofore, a solvent system containing a halogenated hydrocarbon such as methylene chloride has been used for the production of an isobutylene polymer. However, such a solvent system has a great adverse effect on the environment. Therefore, a non-halogenated solvent is desirable. The present invention is characterized by the use of a hydrocarbon solvent as a reaction solvent. The resulting polymer has good properties. Further, compounds which are produced as by-products during the reaction can be easily removed, enabling the recycling of the solvent used. Thus, the production cost can be reduced.

8 Claims, No Drawings

PROCESS FOR PRODUCING UNSATURATED GROUP-TERMINATED ISOBUTYLENE POLYMER

FIELD OF THE INVENTION

The present invention relates to a process for producing an isobutylene polymer having a functional group. More particularly, the present invention relates to a solvent for use in the polymerization reaction.

BACKGROUND OF THE INVENTION

A terminal functional polymer (e.g., a polymer having a vinyl group at both terminals thereof) is useful as materials for producing photo-setting resins, UV-setting resins, electron radiation-curing resins, sealing compounds for electronics, adhesives, modifiers, coating materials, constructional sealings, sealing compounds for laminating glasses, gaskets, medical adhesives or sealings, insulation, etc.

It is known that an isobutylene polymer having, for example, a chlorine atom bonded to a tertiary carbon, as a terminal functional polymer can be prepared by an inifer method which comprises the cationic polymerization of isobutylene with the use of 1,4-bis($\alpha$-chloroisopropyl) benzene (hereinafter, simply referred to as "p-DCC") or 1,3,5-tris($\alpha$-chloroisopropyl)benzene (hereinafter, simply referred to as "TCC") as an initiator and boron trichloride as a catalyst (cf. U.S. Pat. No. 4,276,394).

Furthermore, many reports have been made by Kennedy et al. that when the foregoing cationic polymerization reaction is effected in a solvent containing a halogenated hydrocarbon such as methyl chloride and methylene chloride in the presence of an electron donor, an isobutylene polymer having a small Mw/Mn as determined by GPC (i.e., a polymer having a regular molecular weight) can be obtained (J. Macromol. Sci. Chem., A18 (1), 25 (1982), Polym. Bull., 20, 413 (1988), Polym. Bull., 26, 305 (1991) and JP-A-1-318014 (corresponding to U.S. Pat. No. 5,169,914) (The term "JP-A" as used herein means an "unexamined published Japanese patent application")).

As mentioned above, a halogenated hydrocarbon gives a proper dielectric constant to stabilize the growth terminal. Thus, such a halogenated hydrocarbon is widely used as a solvent for cationic polymerization. However, a halogenated hydrocarbon is disadvantageous in that it is difficult to handle and it needs much care to prevent environmental pollution.

In other words, methyl chloride has a boiling point as low as −23.7° C. and a high toxicity. Legally speaking, methyl chloride is designated as a high pressure gas as well as a toxic gas, and thus is a substance which is extremely difficult to handle.

On the other hand, methyl chloride has a water-solubility as high as 2.0% (20° C.). Further, it is difficult to make methylene chloride dissolved in water harmless. Thus, it has been desired to use a safer solvent as a substitute for such a halogenated hydrocarbon.

One of the objects of the present invention is to provide a novel non-halogenated hydrocarbon solvent component which can give a good isobutylene polymer.

The synthesis of an isobutylene polymer by the inifer process is mainly characterized by easy introduction of an olefinically functional group into the ends of the polymer. As the method for the introduction of olefin into the ends of an isobutylene polymer, there has been known a method which comprises allowing an allyltrimethylsilane to act on the chlorine group end of the isobutylene polymer in the presence of a Lewis acid to introduce an allyl group into the isobutylene polymer (JP-A-63-105005 and U.S. Pat. No. 4,758,631). This reaction also produces trimethylchlorosilane. After this reaction, the deactivation of the Lewis acid is effected by the use of water. Accordingly, trimethylchlorosilane produced by the allylation reaction at the ends of the isobutylene polymer is decomposed to give hexamethyldisiloxane.

Hexamethyldisiloxane thus produced in the reaction system inhibits the polymerization reaction for the preparation of an isobutylene polymer. In other words, when the polymerization reaction is effected in a solvent system containing hexamethyldisiloxane, the resulting polymer disadvantageously has a great dispersion (Mw/Mn). Thus, the polymerization reaction is preferably effected in a solvent system substantially free of hexamethyldisiloxane.

Accordingly, it is necessary that hexamethyldisiloxane is removed from a reaction solvent in consideration of its reuse in the production of an isobutylene polymer.

SUMMARY OF THE INVENTION

It is therefore an object of the present invention to provide a novel halogen-free solvent component which can produce a good isobutylene polymer and a solvent system which can be easily reused.

It is another object of the present invention to provide a hydrocarbon solvent component from which hexamethyldisiloxane can be easily removed by distillation.

These and other objects of the present invention will become more apparent from the following detailed description and examples.

The present inventors have conducted extensive investigation to find out a solvent substituting for the halogenated hydrocarbon. As a result, the present invention has been accomplished based on the findings.

In the present invention, it is necessary that hexamethyldisiloxane produced after reaction be removed.

Since this compound has a boiling point of 100° C., any solvent having a lower or higher boiling point than this compound may be employed. In other words, hexamethyldisiloxane can be removed from such a solvent by distillation after reaction in principle.

After the completion of reaction, the solvent contains hexamethyldisiloxane in an amount of not more than 2% by weight based on the weight of the reaction solution assuming that hexamethyldisiloxane is quantitatively produced from the allylsilane used. In the distillation process for the removal of hexamethyldisiloxane, hexamethyldisiloxane can be advantageously removed as a forerun by selecting a solvent having a higher boiling point than that of hexamethyldisiloxane from the standpoint of the thermal efficiency of distillation or the cost of the still. Therefore, the boiling point of the solvent to be used is preferably higher than that of hexamethyldisiloxane. The inventors made studies of a solvent system which can meet these requirements to provide a good isobutylene polymer. As a result, an effective solvent system has been found.

The constitution of the present invention is as follows:

1. A process for producing an isobutylene polymer, which comprises performing a reaction in a hydrocarbon solvent having a boiling point of not lower than 105° C. and a melting point of not higher than −90° C.

2. A process for producing an isobutylene polymer, which comprises mixing the following components (1) to (6) at a temperature of from −100° C. to 0° C.:

(1) a cation polymerizable monomer containing isobutylene;

(2) a compound represented by formula (I):

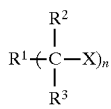

wherein $R^1$ represents an aromatic ring group, or a substituted or unsubstituted aliphatic hydrocarbon group; $R^2$ and $R^3$ may be the same or different and each represents a hydrogen atom, or substituted or unsubstituted monovalent hydrocarbon group, with the proviso that when $R^1$ is an aliphatic hydrocarbon group, a $R^2$ and $R^3$ are not a hydrogen atom at the same time; X represents a halogen atom, a $R^4COO$— group (in which $R^4$ represents a hydrogen atom or a $C_{1-5}$ alkyl group) or a $R^5O$— group (in which $R^5$ represents a hydrogen atom or a $C_{1-5}$ alkyl group); and n represents an integer of from 1 to 8;

(3) a Lewis acid;

(4) an electron donating component, in which a donor number defined as a parameter indicating the intensity of a various compound as an electron donor is from 15 to 50;

(5) a hydrocarbon solvent having a boiling point of not lower than 105° C. and a melting point of not higher than −90° C.; and (6) an allyltrimethylsilane.

3. The process for the production of an isobutylene polymer according to the above 1 or 2, wherein the reaction system does not substantially contain hexamethyldisiloxane from the hydrocarbon solvent having a boiling point of not lower than 105° C. and a melting point of not higher than −90° C. when the reaction is effected in the hydrocarbon solvent.

4. The process for the production of an isobutylene polymer according to any one of the above 1 to 3, wherein the hydrocarbon solvent having a boiling point of not lower than 105° C. and a melting point of not higher than −90° C. is selected from the group consisting of toluene, ethylcyclohexane, 2,2,3-trimethylpentane and 2,2,5-trimethylhexane.

5. The process for the production of an isobutylene polymer according to the above 4, wherein the hydrocarbon solvent having a boiling point of not lower than 105° C. and a melting point of not higher than −90° C. is a mixture of toluene and ethylcyclohexane.

6. The process for the production of an isobutylene polymer according to the above 5, wherein the mixing ratio of toluene and ethylcyclohexane by volume is from 8:2 to 7:3.

7. The process for the production of an isobutylene polymer according to any one of the above 2 to 6, wherein the Lewis acid component is selected from the group consisting of boron trichloride, titanium tetrachloride and tin tetrachloride.

8. The process for the production of an isobutylene polymer according to any one of the above 2 to 7, wherein the electron donating component is selected from the group consisting of pyridines, amines, amides and sulfoxides.

9. The process for the production of an isobutylene polymer according to the above 2, wherein the amount of the components (1) to (4) and (6) are each regulated to the level as defined below:

(1) the concentration of a cation polymerizable monomer containing isobutylene ranges from 0.1 to 10 mol/l;

(2) the amount of the compound represented by the formula (1) ranges from 0.01 to 20% by weight based on the weight of the cation polymerizable monomer containing isobutylene;

(3) the amount of a Lewis acid is from 0.1 to 100 times by mol as much as the compound represented by the formula (1);

(4) the amount of an electron donating component is from 0.01 to 10 times by mol as much as the compound represented by the formula (I); and (6) the amount of the allyltrimethylsilane is from 0.75 to 1.5 times by mol as much as the terminal functional group in the compound represented by the formula (I).

10. An isobutylene polymer produced by mixing the following components (1) to (6) at a temperature of from −100° C. to 0° C.:

(1) a cation polymerizable monomer containing isobutylene;

(2) a compound represented by formula (I):

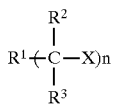

wherein $R^1$ represents an aromatic ring group, or a substituted or unsubstituted aliphatic hydrocarbon group; $R^2$ and $R^3$ may be the same or different and each represents a hydrogen atom, or substituted or unsubstituted monovalent hydrocarbon group, with the proviso that when $R^1$ is an aliphatic hydrocarbon group, a $R^2$ and $R^3$ are not a hydrogen atom at the same time; X represents a halogen atom, a $R^4COO$— group (in which $R^4$ represents a hydrogen atom or a $C_{1-5}$ alkyl group) or a $R^5O$— group (in which $R^5$ represents a hydrogen atom or a $C_{1-5}$ alkyl group); and n represents an integer of from 1 to 8;

(3) a Lewis acid;

(4) an electron donating component, in which a donor number defined as a parameter indicating the intensity of a various compound as an electron donor is from 15 to 50;

(5) a hydrocarbon solvent having a boiling point of not lower than 105° C. and a melting point of not higher than −90° C.; and (6) an allyltrimethylsilane.

11. The production of an isobutylene polymer according to the above 10, wherein the amount of the components (1) to (4) and (6) are each regulated to the level as defined below:

(1) the concentration of a cation polymerizable monomer containing isobutylene ranges from 0.1 to 10 mol/l;

(2) the amount of the compound represented by the formula (1) ranges from 0.01 to 20% by weight based on the weight of the cation polymerizable monomer containing isobutylene;

(3) the amount of a Lewis acid is from 0.1 to 100 times by mol as much as the compound represented by the formula (1);

(4) the amount of an electron donating component is from 0.01 to 10 times by mol as much as the compound represented by the formula (I); and (6) the amount-of the allyltrimethylsilane is from 0.75 to 1.5 times by mol as much as the terminal functional group in the compound represented by the formula (I).

DETAILED DESCRIPTION OF THE INVENTION

In the present invention, the number-average molecular weight (Mn) and Mw/Mn value (Mw: weight-average molecular weight) of the isobutylene polymer having unsaturated group is determined by GPC using a polystyrene gel column (Shodex K-804, available from Showa Denko K.K.; mobile phase: chloroform) as calculated in terms of polystyrene.

In the present invention, the number-average molecular weight (Mn) of the isobutylene polymer determined by GPC usually ranges from 500 to 300,000, preferably from 1,000 to 50,000. An isobutylene polymer having Mn of lower than 500 has no excellent properties inherent to isobutylene polymer. On the contrary, an isobutylene polymer having Mn of more than 300,000 becomes so solid that it is extremely difficult to work.

In the present invention, the cation polymerizable monomer containing isobutylene is not limited to a monomer comprising isobutylene alone. It means a monomer having nor more than 50 mol % (hereinafter, simply referred to as "%") of isobutylene substituted by a cation polymerizable monomer copolymerizable with isobutylene.

Examples of the cation polymerizable monomer copolymerizable with isobutylene include $C_{3-12}$ olefins, conjugated dienes, vinyl ethers, aromatic vinyl compounds, norbornenes, and vinylsilanes. Preferred among these compounds are $C_{3-12}$ olefins and aromatic vinyl compounds.

Specific examples of the cation polymerizable monomer copolymerizable with isobutylene as described above usually include propene, 1-butene, 2-butene, 2-methyl-1-butene, 3-methyl-1-butene, pentene, hexene, cyclohexene, vinylcyclohexane, 5-ethylidenenorbornene, 5-propylidenenorbornene, butadiene, isoprene, cyclopentadiene, methyl vinyl ether, ethyl vinyl ether, isobutyl vinyl ether, vinylcarbazole, methoxystyrene, ethoxystyrene, t-butoxystyrene, hexenyloxystyrene, styrene, α-methylstyrehe, methylstyrene, dimethylstyrene, chloromethylstyrene, chlorostyrene, indene, β-pinene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, γ-methacryloyloxypropyltrimethoxysilane, and γ-methacryloyloxypropylmethyldimethoxysilane.

Preferred among these compounds are propene, 1-butene, 2-butene, cyclopentadiene, 5-ethylidenenorbornene, isobutyl vinyl ether, methoxystyrene and styrene. These cation polymerizable monomers copolymerizable with isobutylene may be used individually or in combination of two or more thereof. In the present invention, the concentration of the cation polymerizable monomer containing isobutylene to be used, for example, in a batch process, is usually from 0.1 to 10 mol/l, preferably from 0.5 to 6 mol/l.

Examples of the compound represented by the formula (I) to be used herein include a compound represented by the following formula (II):

$$AY_n \qquad (II)$$

wherein A represents a group having from 1 to 4 aromatic rings; Y represents a group, which is bonded to an aromatic ring, represented by the following formula (III):

wherein $R^6$ and $R^7$ may be the same or different and each represents a hydrogen atom or a $C_{1-20}$ monovalent hydrocarbon group; X represents a halogen atom, a $R^4COO-$ group (in which $R^4$ represents a hydrogen atom or a $C_{1-5}$ alkyl group) or a $R^5O-$ group (in which $R^5$ represents a hydrogen atom or a $C_{1-5}$ alkyl group); and n represents an integer of from 1 to 8; a compound represented by the following formula (IV):

wherein B represents a $C_{4-40}$ (preferably $C_{9-20}$) substituted or unsubstituted hydrocarbon group; Z represents a halogen atom bonded to the tertiary carbon atom, a $R^8COO-$ group (in which $R^8$ represents a hydrogen atom or a $C_{1-5}$ alkyl group) or a $R^9O-$ group (in which $R^9$ represents a hydrogen atom or a $C_{1-5}$ alkyl group); and m represents an integer of from 1 to 4; and oligomers having an α-halostyrene unit. However, the present invention is not limited to these compounds. These compounds may be used individually or in combination.

The group A having 1 to 4 aromatic rings in the compound represented by the formula (II) may be either a product of condensation reaction or one of the uncondensed type. Examples of such a group having aromatic rings include phenyl, biphenyl, naphthyl, anthracene, phenanthrenyl, pyrenyl and Ph-$(CH_2)_L$-Ph (Ph represents a phenyl group, and L represents an integer of from 1 to 10) groups having a valence of from 1 to 6. These groups having aromatic rings may be substituted by a $C_{1-20}$ straight-chain and/or branched aliphatic hydrocarbon group or a group having a functional group such as a hydroxyl group, an ether group and a vinyl group.

Examples of the compound represented by the formula (IV) to be used herein include compounds having a functional group other than Z, such as a vinyl group and a silyl group.

Examples of the oligomer having α-halostyrene unit, which can be used as an initiator/chain transfer agent, include α-chlorostyrene oligomer and oligomers obtained by the copolymerization of α-chlorostyrene with a monomer copolymerizable therewith.

In the present invention, if, among the compounds represented by the formula (I), a compound having a two or more halogen atoms, $R^4COO-$ groups (in which $R^4$ represents a hydrogen atom or a $C_{1-5}$ alkyl group) or $R^5O-$ groups (in which $R^5$ represents a hydrogen atom or a $C_{1-5}$ alkyl group), or a compound having a halogen atom, a $R^4COO-$ group or a $R^5O-$ group together with other reactive functional group(s) is used as an initiator/chain transfer agent, the resulting polymer can be rendered more functional to advantage.

Specific examples of the compound represented by the formula (I) to be used herein include:

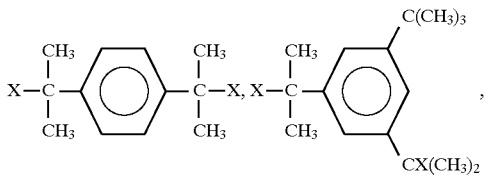

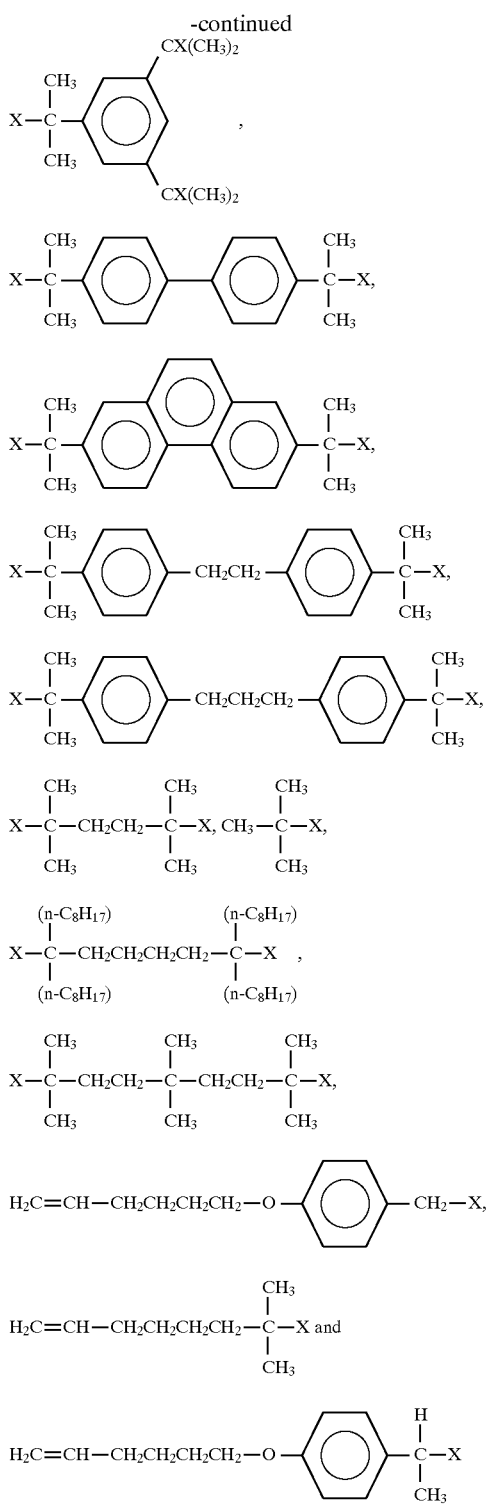

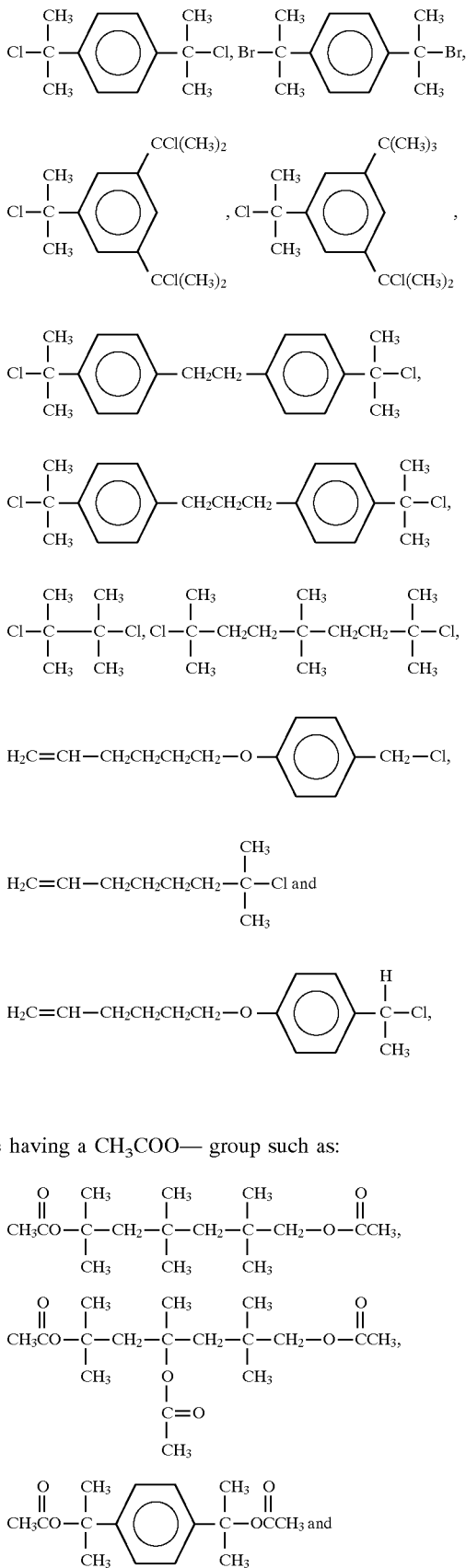

wherein X represents a halogen atom, a $R^4COO-$ group (in which $R^4$ represents a hydrogen atom or a $C_{1-5}$ alkyl group) or $R^5O-$ group (in which $R^5$ represents a hydrogen atom or $C_{1-5}$ alkyl group); and α-chlorostyrene oligomer. However, the present invention is not limited to these compounds. Among these compounds, the following compounds are preferred:

those having a $CH_3COO-$ group such as:

-continued

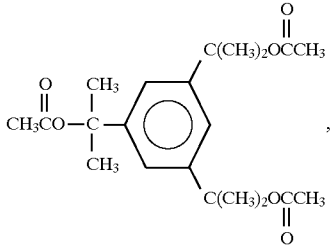

and those having a CH₃O— group such as:

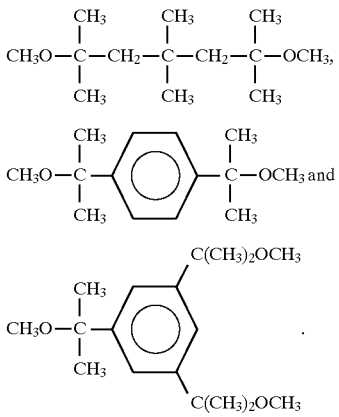

These compounds are used as an initiator. In the present invention, these compounds may be used individually or in combination. By properly controlling the amount of these compounds used, the number-average molecular weight of the resulting isobutylene polymer can be arbitrarily determined.

In the present invention, the amount of the compound represented by the formula (I) to be used is usually from 0.01 to 20% by weight, preferably from 0.1 to 10% by weight based on the weight of the cation polymerizable monomer containing isobutylene.

Examples of the Lewis acid to be used herein usually include metal halides such as $AlCl_3$, $SnCl_4$, $TiCl_4$, $VCl_5$, $FeCl_3$, $BCl_3$ and $BF_3$, and organic aluminum compounds such as $Et_2AlCl$ and $EtAlCl_2$. However, the present invention is not limited to these compounds. Preferred among these compounds are $SnCl_4$, $TiCl_4$, and $BCl_3$.

In the present invention, the Lewis acid is usually used in an amount of from 0.1 to 100 times by mol, preferably from 0.3 to 30 times by mol, as much as the compound represented by the formula (I).

In the present invention, the electron donating component to be used herein may be selected from a broad range of the publicly known compounds, so long as the donor number thereof is 15 to 50. Preferred examples of the electron donating component include pyridines, amines, amides and sulfoxides. However, the present invention is not limited to these compounds.

Specific examples of the electron donating component to be used in the present invention, in which a donor number defined as a parameter indicating the intensity of an electron donor of various compounds is from 15 to 50 (the various donor numbers are disclosed, for example, in V. Gutman, *Donor and Acceptor*, (translated by Otaki and Okada) Gakkai Shuppan Center (1983)) generally include 2,6-di-t-butylpyridine, 2-t-butylpyridine, 2,4,6-trimethylpyridine, 2,6-dimethylpyridine, 2-methylpyridine, pyridine, diethylamine, trimethylamine, triethylamine, tributylamine, diethylamine, N,N-dimethylaniline, aniline, N,N-dimethylformamide, N,N-dimethylacetamide, N,N-diethylacetamide, dimethyl sulfoxide, diethyl ether, methyl acetate, ethyl acetate, trimethyl phosphate, tributyl phosphate and triamide hexamethylphosphate. Preferred among these electron donors are 2,6-di-t-butylpyridine, 2,6-dimethylpyridine, 2-methylpyridine, pyridine, diethylamine, trimethylamine, triethylamine, N,N-dimethylformamide, N,N-dimethylacetamide, and dimethyl sulfoxide, more preferably picolines. Particularly preferred among these electron donors is 2-methylpyridine, which can exert a remarkable effect when added regardless of its relatively small donor number contained therein.

In the present invention, the electron donating component is usually used in an amount of from 0.01 to 10 times by mol, preferably from 0.2 to 2 times by mol, as much as the compound represented by the formula (I).

As the solvent which can be used in the present invention, there may be normally used a compound having a boiling point of not lower than 105° C. and a melting point of not higher than −90° C. as determined in the form of single solvent. Alternatively, hydrocarbon compounds, which do not solidify at the reaction temperature, may be used as a mixed solvent in the reaction.

Example of the hydrocarbon solvent having a boiling point of not lower that 105° C. and a melting point of not higher than −90° C. may be selected from various solvents. One of the measures for the selection of the solvents is preferably to elect such a solvent that does not precipitate the desired isobutylene polymer in the course of the polymerization reaction. If the isobutylene polymer is precipitated during the polymerization reaction, the properties of the resulting polymer are deteriorated. Also, even in case of the solvent which does not precipitate the desired isobutylene polymer during the polymerization reaction, it is preferred from the viewpoint of the commercial production to select a solvent having a solubility of 15% by weight or more (15 g; the total amount of the isobutylene polymer dissolved in 100 g of the solvent at −70° C.), more preferably 19% by weight or more, most preferably 22% by weight or more. However, it is not limited so long as the desired isobutylene polymer is dissolved without precipitating during the polymerization reaction. Further, the hydrocarbon solvent having a boiling point of not lower than 105° C. and a melting point of not higher than −90° C. may be used together with a halogenated hydrocarbon solvent, so long as the combined use does not suffer from defects such that it is difficult to handle the solvents, it is difficult to operate the polymerization and it needs much care to present environmental pollution.

Among hydrocarbon solvents having a boiling point of not lower than 105° C. and a melting point of not higher than −90° C., toluene, ethyl cyclohexane, 2,3,3-trimethylpentane and 2,2,5-trimethylhexane are preferably selected. A particularly preferred example of such a hydrocarbon solvent is a mixture of toluene and ethyl cyclohexane.

As the terminal functionalizer which can be used in the present invention, an allyltrimethylsilane is used. The allyltrimethylsilane is normally used in an amount of from 0.75 to 1.5 equivalents, preferably from 1 to 1.5 equivalents to the number of functional groups in the polyfunctional initiator. For example, if a bifunctional initiator such as p-DCC is used, the allyltrimethylsilane is normally used in an amount of from 2 to 3 times by mol as much as the initiator used. When the reaction is effected in the presence of an allyltrimethylsilane in an amount of 2 times by mol as much as the initiator, the functionalization can proceed quantitatively. Therefore, the allyltrimethylsilane is preferably used in an amount of 2 times by mol as much as the as initiator. The reaction time is usually from 10 to 200 minutes, preferably from 30 to 180 minutes, more preferably 90 to 180 minutes. The allyltrimethylsilane can be reacted with an isobutylene polymer at the same temperature as in the polymerization reaction to obtain a vinyl group-terminated isobutylene polymer.

In the reaction system of the present invention, the reaction is followed by the deactivation of the catalyst with water after the completion of the reaction. The deactivation process is accompanied by the reaction of trimethylchlorosilane produced when an olefin has been introduced into the ends of the polymer in the presence of water resulting in the production of hexamethyldisiloxane. If the production of an isobutylene polymer is effected in a solvent system containing hexamethyldisilbxane, the resulting polymer has an increased dispersion (Mw/Mn), resulting in an increase in the viscosity thereof. Therefore, the polymerization reaction is preferably effected in a solvent system substantially free of hexamethyldisiloxane.

The viscosity of an isobutylene polymer depends on the molecular weight thereof. The more the molecular weight of the isobutylene polymer is, the less is the polymer apt to the effect of hexamethyldisiloxane. In a polymer having a number-average molecular weight of from 7,000 to 10,000 as determined by GPC, the viscosity of an isobutylene polymer shows no big change if the hexamethyldisiloxane content in the solvent used is not more than 1 to 2% by weight. Similarly, in a polymer having a number-average molecular weight of from 17,000to 25,000 as determined by GPC, the viscosity of an isobutylene polymer shows no big change if the hexamethyldisiloxane content in the solvent used is not more than 3% by weight. Therefore, it can be considered that substantially no hexamethyldisiloxane is contained in the solvent. It is more preferred that the polymerization system for the production of an isobutylene polymer is free of hexamethyldisiloxane.

Studies were made of the removal by distillation of hexamethyldisiloxane obtained in the solvent by the polymerization reaction. As a result, it was found that the hexamethyldisiloxane content in the solvent thus obtained is not more than 50 ppm. In this manner, the recycling of the solvent is made possible.

The present invention will be further described in the following Examples, but the present invention should not be construed as being limited thereto. The molecular weight as used hereinafter is determined by GPC and NMR.

GPC Analysis

System: analytical system manufactured by Waters Co., Ltd.
(pump 600E; differential refractometer 401).
Column: Shodex K-804, manufactured by Showa Denko K.K.
(polystyrene gel).
Mobile phase: chloroform
(Number-average molecular weight, etc. are determined as calculated in terms of polystyrene). $^1$H-NMR spectrum (300 Hz): Gemini-300, manufactured by Valian Corp.

Fn (vinyl) represents the number of vinyl groups per initiator in the isobutylene polymer and can be calculated based on the NMR spectrum data. Fn (vinyl)* represents the number of vinyl groups per molecule of the isobutylene polymer and can be calculated based on the NMR spectrum and GPC data. Fn (vinyl)* can be determined as follows:

(1) The integral value of the peak attirubutable to H atoms contained in each functional group in NMR is determined.

(2) The integral value obtained in the step (1) is divided by the number of H atoms in the respective functional group. (referred to as (1))

(3) The value (1) corresponding to the respective functional group is divided by the value (1) corresponding to the initiator to give the number of functional groups per molecule of oligomer (Fn).

(4) The molecular weight Mn (GPC) determined by GPC is divided by 56, which is the molecular weight of isobutylene group, to determine the number of isobutylene groups contained per molecule of oligomer (n*).

(5) The value (1) corresponding to isobutylene group is divided by n*. (referred to as (2))

(6) The value (1) corresponding to each functional group is divided by the value (2) to determine the number of functional groups per-molecule of oligomer (Fn*).

The viscosity of the isobutylene polymer was measured by means of an E type viscometer (VISCONIC EHD, manufactured by Tokyo Keiki K.K.) at a temperature of 50° C.

EXAMPLE 1

A three-way cock was attached to a 500-ml pressure glass container. The air in the container was then replaced by nitrogen. Into the container were then charged 54 ml of ethyl cyclohexane (which had been dried by allowing to stand with a molecular sieve 3A overnight or longer), 126 ml of toluene (which had been dried by allowing to stand with a molecular sieve 3A overnight or longer) and 1.16 g (5.02 mmol) of p-DCC through a hypodermic syringe. Subsequently, to the three-way cock was connected a pressure glass tube for collecting a liquefied gas with a needle valve containing 56 ml of an isobutylene monomer. The polymerization container was cooled by immersing in a dry ice/ethanol bath at −70° C. Then, the pressure in the container was reduced by means of a vacuum pump. The needle valve was then opened to introduce the isobutylene monomer into the polymerization container through the liquefied gas collecting tube. Nitrogen was then introduced into the polymerization container through one of the ways of the three-way cock so that the pressure in the container was returned to normal value. Subsequently, 0.093 g (1.0 mmol) of 2-methylpyridine was added thereto. Further, 1.65 ml (15.1 mmol) of titanium tetrachloride was added to the polymerization system to initiate polymerization. After 70 minutes of reaction, 1.22 g (10.8 mmol) of an allyltrimethylsilane was added to the reaction system so that allyl group was introduced into the ends of the polymer. After 120 minutes of reaction, the reaction solution was washed with four portions of 200 ml of water. The solvent was then evaporated to give an isobutylene polymer. The results are shown in Table 1.

EXAMPLE 2

The procedure of Example 1 was followed to produce an isobutylene polymer except that 0.022% by weight (0.045 ml) of hexamethyldisiloxane was incorporated in the solvent to be added. The isobutylene polymer thus produced was then evaluated in the same manner as in Example 1. The results are shown in Table 1.

EXAMPLE 3

The procedure of Example 1 was followed to produce an isobutylene polymer except that 0.05% by weight (0.090 ml) of hexamethyldisiloxane was incorporated in the solvent to be added. The isobutylene polymer thus produced was then evaluated in the same manner as in Example 1. The results are shown in Table 1.

EXAMPLE 4

The procedure of Example 1 was followed to produce an isobutylene polymer except that 0.1% by weight (0.18 ml) of hexamethyldisiloxane was incorporated in the solvent to be added. The isobutylene polymer thus produced was then evaluated in the same manner as in Example 1. The results are shown in Table 1.

EXAMPLE 5

The procedure of Example 1 was followed to produce an isobutylene polymer except that 0.5% by weight (0.9 ml) of hexamethyldisiloxane was incorporated in the solvent to be added. The isobutylene polymer thus produced was then evaluated in the same manner as in Example 1. The results are shown in Table 1.

EXAMPLE 6

The procedure of Example 1 was followed to produce an isobutylene polymer except that 1.0% by weight (1.8 ml) of hexamethyldisiloxane was incorporated in the solvent to be added. The isobutylene polymer thus produced was then evaluated in the same manner as in Example 1. The results are shown in Table 1.

EXAMPLE 7

The procedure of Example 1 was followed to produce an isobutylene polymer except that 2.5% by weight (4.5 ml) of hexamethyldisiloxane was incorporated in the solvent to be added. The isobutylene polymer thus produced was then evaluated in the same manner as in Example 1. The results are shown in Table 1.

EXAMPLE 8

The procedure of Example 1 was followed to produce an isobutylene polymer except that 5.0% by weight (9.0 ml) of hexamethyldisiloxane was incorporated in the solvent to be added. The isobutylene polymer thus produced was then evaluated in the same manner as in Example 1. The results are shown in Table 1.

EXAMPLE 9

The procedure of Example 1 was followed to produce an isobutylene polymer except that 10.0% by weight (18.0 ml) of hexamethyldisiloxane was incorporated in the solvent to be added. The isobutylene polymer thus produced was then evaluated in the same manner as in Example 1. The results are shown in Table 1.

EXAMPLE 10

A three-way cock was attached to a 500-ml pressure glass container. The air in the container was then replaced by nitrogen. Into the container were then charged 36 ml of ethyl cyclohexane (which had been dried by allowing to stand with a molecular sieve 3A overnight or longer), 144 ml of toluene (which had been dried by allowing to stand with a molecular sieve 3A overnight or longer) and 447 mg (1.93 mmol) of p-DCC through a hypodermic syringe. Subsequently, to the three-way cock was connected a pressure glass tube for collecting a liquefied gas with a needle valve containing 58 ml of an isobutylene monomer. The polymerization container was cooled by immersing a dry ice/ethanol bath at −70° C. Then, the pressure in the container was reduced by means of a vacuum pump. The needle valve was then opened to introduce the isobutylene monomer into the polymerization container through the liquefied gas collecting tube. Nitrogen was then introduced into the polymerization container through one of the ways of the three-way cock so that the pressure in the container was returned to normal value. Subsequently, 0.072 g (0.772 mmol) of 2-methylpyridine was added thereto. Further, 1.67 ml (15.2 mmol) of titanium tetrachloride was added to the polymerization system to initiate polymerization. After 100 minutes of reaction, 461 mg (4.03 mmol) of an allyltrimethylsilane was added to the reaction system so that allyl group was introduced into the terminals of the polymer. After 120 minutes of reaction, the reaction solution was washed with four portions of 200 ml of water. The solvent was then evaporated to give an isobutylene polymer. The results are shown in Table 2.

EXAMPLE 11

The procedure of Example 10 was followed to produce an isobutylene polymer except that 0.89% by weight (1.8 ml) of hexamethyldisiloxane was incorporated in the solvent to be added. The isobutylene polymer thus produced was then evaluated in the same manner as in Example 10. The results are shown in Table 2.

EXAMPLE 12

The procedure of Example 10 was followed to produce an isobutylene polymer except that 2.2% by weight (4.5 ml) of hexamethyldisiloxane was incorporated in the solvent to be

TABLE 1

Synthesis (1) of allyl-terminated polyisobutylene in the presence of hexamethyldisiloxane (ethylcyclohexane/toluene = 3/7; predetermined molecular weight: 10,000)

| Example No. | Hexamethyl-disiloxane (wt %)* | GPC | | | NMR | | Viscosity |
|---|---|---|---|---|---|---|---|
| | | Mn | Mw/Mn | Mn | Fn (vinyl) | Fn (vinyl)* | (poise) |
| 1 | 0.0 | 7,660 | 1.36 | 8,710 | 2.09 | 1.84 | 1,638 |
| 2 | 0.022 | 8,728 | 1.34 | 9,689 | 2.11 | 1.90 | — |
| 3 | 0.045 | 8,045 | 1.38 | 9,520 | 2.10 | 1.77 | — |
| 4 | 0.085 | 7,730 | 1.43 | 9,010 | 2.16 | 1.85 | 1,650 |
| 5 | 0.42 | 8,057 | 1.48 | 9,118 | 2.09 | 1.85 | — |
| 6 | 0.85 | 7,649 | 1.50 | 9,156 | 2.12 | 1.77 | 1,730 |
| 7 | 2.25 | 7,631 | 1.52 | 8,837 | 1.94 | 1.68 | 1,690 |
| 8 | 4.28 | 7,485 | 1.75 | 8,906 | 2.14 | 1.80 | 2,175 |
| 9 | 9.10 | 7,208 | 2.80 | 9,709 | 2.26 | 1.68 | 4,550 |

*: The amount(wt %) of hexamethyldisiloxane = hexamethyldisiloxane (g)/(hexamethyldisiloxane (g) + tolyene (g) + ethylcyclohexane(g)).

added. The isobutylene polymer thus produced was then evaluated in the same manner as in Example 10. The results are shown in Table 2.

EXAMPLE 13

The procedure of Example 10 was followed to produce an isobutylene polymer except that 4.5% by weight (9.0 ml) of hexamethyldisiloxane was incorporated in the solvent to be added. The isobutylene polymer thus produced was then evaluated in the same manner as in Example 10. The results are shown in Table 2.

TABLE 2

Synthesis (1) of allyl-terminated polyisobutylene in the presence of hexamethyldisiloxane (ethylcyclohexane/toluene = 2/8; predetermined molecular weight: 20,000)

| Example No. | Hexamethyl-disiloxane (wt %) | GPC Mn | GPC Mw/Mn | NMR Mn | NMR Fn (vinyl) | NMR Fn (vinyl)* | Viscosity (poise) |
|---|---|---|---|---|---|---|---|
| 10 | 0.0 | 22,913 | 1.17 | 28,858 | 2.03 | 1.61 | 9,100 |
| 11 | 0.89 | 22,003 | 1.19 | 24,159 | 1.96 | 1.79 | 9,700 |
| 12 | 2.22 | 21,814 | 1.20 | 25,435 | 2.18 | 1.87 | 9,720 |
| 13 | 4.46 | 20,722 | 1.27 | 22,155 | 2.04 | 1.87 | 9,950 |

*: The amount(wt %) of hexamethyldisiloxane = hexamethyldisiloxane (g)/(hexamethyldisiloxane (g) + tolyene (g) + ethylcyclohexane(g)).

The results of these examinations show a phenomenon that a polymer obtained from a reaction system containing hexamethyldisiloxane has an increased dispersion. It was also found that the dispersion value increases with the rise in the amount of hexamethyldisiloxane added.

EXAMPLE 14

A three-way cock was attached to a 500-ml pressure glass container. The air in the container was then replaced by nitrogen. Into the container were then charged 36 ml of ethyl cyclohexane (which had been dried by allowing to stand with a molecular sieve 3A overnight or longer), 144 ml of toluene (which had been dried by allowing to stand with a molecular sieve 3A overnight or longer) and 1.98 g (8.56 mmol) of p-DCC through a hypodermic syringe. Subsequently, to the three-way cock was connected a pressure glass tube for collecting a liquefied gas with a needle valve containing 58 ml of an isobutylene monomer. The polymerization container was cooled by immersing in a dry ice/ethanol bath at −70° C. Then, the pressure in the container was reduced by means of a vacuum pump. The needle valve was then opened to introduce the isobutylene monomer into the polymerization container through the liquefied gas collecting tube. Nitrogen was then introduced into the polymerization container through one of the ways of the three-way cock so that the pressure in the container was returned to normal value. Subsequently, 0.072 g (0.772 mmol) of 2-methylpyridine was added thereto. Further, 1.67 ml (15.2 mmol) of titanium tetrachloride was added to the polymerization system to initiate polymerization. After 40 minutes of reaction, 2.41 g (21.1 mmol, toluene solution) of an allyltrimethylsilane was added to the reaction system so that allyl group was introduced into the ends of the polymer. After 120 minutes of reaction, the reaction solution was washed with four portions of 200 ml of water. The solvent was then evaporated to give an isobutylene polymer. The results are shown in Table 3.

EXAMPLE 15

The procedure of Example 14 was followed to produce an isobutylene polymer except that the amounts of the isobutylene monomer and p-DCC added were changed to 45 ml and 1.55 g (6.7 mmol), respectively. The isobutylene polymer thus produced was then evaluated in the same manner as in Example 14. The results are shown in Table 3.

TABLE 3

Synthesis of allyl-terminated polyisobutylene in ethylcyclohexane/toluene solvent (ethylcyclohexane/toluene = 2/8; predetermined molecular weight: 20,000)

| Example No. | Monomer concentration (wt %) | GPC Mn | GPC Mw/Mn | NMR Mn | NMR Fn (vinyl) | NMR Fn (vinyl)* |
|---|---|---|---|---|---|---|
| 14 | 20 | 4,937 | 1.46 | 6,658 | 2.22 | 1.65 |
| 15 | 16 | 4,631 | 1.52 | 5,635 | 1.87 | 1.54 |

The "monomer concentration(wt %)" was calculated from the monomer content in the solution, i.e., monomer content/(monomer content + solvent content).

EXAMPLE 16

A three-way cock was attached to a 300-ml pressure glass container. The air in the container was then replaced by nitrogen. Into the container were then charged 17.5 ml of ethyl cyclohexane (which had been dried by allowing to stand with a molecular sieve 3A overnight or longer), 70.2 ml of toluene (which had been dried by allowing to stand with a molecular sieve 3A overnight or longer) and 0.58 g (2.5 mmol) of p-DCC through a hypodermic syringe. Subsequently, to the three-way cock was connected a pressure glass tube for collecting a liquefied gas with a needle valve containing 28 ml of an isobutylene monomer. The polymerization container was cooled by immersing in a dry ice/ethanol bath at −70° C. Then, the pressure in the container was reduced by means of a vacuum pump. The needle valve was then opened to introduce the isobutylene monomer into the polymerization container through the liquefied gas collecting tube. Nitrogen was then introduced into the polymerization container through one of the ways of the three-way cock so that the pressure in the container was returned to normal value. Subsequently, 0.047 g (0.50 mmol) of 2-methylpyridine was added thereto. Further, 0.83 ml (7.6 mmol) of titanium tetrachloride was added to the polymerization system to initiate polymerization. After 60 minutes of reaction, the reaction solution was washed with four portions of 100 ml of water. The solvent was then evaporated to give an isobutylene polymer. The results are shown in Table 4.

EXAMPLE 17

The procedure of Example 16 was followed to produce an isobutylene polymer except that the amounts of ethyl cyclohexane and toluene added were changed to 26.8 ml and 62.4 ml, respectively. The isobutylene polymer thus produced was then evaluated in the same manner as in Example 16. The results are shown in Table 4.

EXAMPLE 18

The procedure of Example 16 was followed to produce an isobutylene polymer except that the amounts of ethyl cyclohexane and toluene added were changed to 35.8 ml and 53.7 ml, respectively, and no allyltrimethylsilane was added. The isobutylene polymer thus produced was then evaluated in the same manner as in Example 16. The results are shown in Table 4.

TABLE 4

Synthesis of allyl-terminated polyisobutylene in ethylcyclohexane/toluene solvent

| Example No. | EtCy/Toluene (solvent ratio) | GPC Mn | Mw/Mn | NMR Mn | Fn (vinyl) | Fn (vinyl)* |
|---|---|---|---|---|---|---|
| 16 | 2/8 | 6,700 | 1.40 | 7,700 | 2.17 | 1.86 |
| 17 | 3/7 | 7,700 | 1.36 | 8,700 | 2.09 | 1.84 |
| 18 | 4/6 | 6,700 | 1.45 | 7,875 | — | — |

EtCy = ethylcyclohexane

The results set forth in Tables 3 and 4 show that the reaction for the production of an isobutylene polymer requires a proper solution concentration and mixing solvent ratio.

EXAMPLE 19

A three-way cock was attached to a 300-ml pressure glass container. The air in the container was then replaced by nitrogen. Into the container were then charged 17.5 ml of n-octane (which had been dried by allowing to stand with a molecular sieve 3A overnight or longer), 70.2 ml of toluene (which had been dried by allowing to stand with a molecular sieve 3A overnight or longer) and 0.58 g (2.5 mmol) of p-DCC through a hypodermic syringe. Subsequently, to the three-way cock was connected a pressure glass tube for collecting a liquefied gas with a needle valve containing 28 ml of an isobutylene monomer. The polymerization container was cooled by immersing in a dry ice/ethanol bath at −70° C. Then, the pressure in the container was reduced by means of a vacuum pump. The needle valve was then opened to introduce the isobutylene monomer into the polymerization container through the liquefied gas collecting tube. Nitrogen was then introduced into the polymerization container through one of the ways of the three-way cock so that the pressure in the container was returned to normal value. Subsequently, 0.047 g (0.50 mmol) of 2-methylpyridine was added thereto. Further, 0.83 ml (7.6 mmol) of titanium tetrachloride was added to the polymerization system to initiate polymerization. After 100 minutes of reaction, the reaction solution was washed with four portions of 100 ml of water. The solvent was then evaporated to give an isobutylene polymer. The results are shown in Table 5.

EXAMPLE 20

The procedure of Example 19 was followed to produce an isobutylene polymer except that the amounts of n-octane and toluene added were changed to 26.3 ml and 61.4 ml, respectively. The isobutylene polymer thus produced was then evaluated in the same manner as in Example 19. The results are shown in Table 5.

TABLE 5

Synthesis of polyisobutylene in n-octane/toluene solvent

| Example No. | Octane/Toluene (solvent ratio) | GPC Mn | Mw/Mn | NMR Mn |
|---|---|---|---|---|
| 19 | 2/8 | 6,600 | 1.41 | 7,900 |
| 20 | 3/7 | 8,300 | 1.41 | 9,800 |

In accordance with the present invention, it is made possible to produce an unsaturated group-terminated isobutylene polymer having a narrow distribution of molecular weight in a hydrocarbon solvent free of halogen compound at a high percent functionalization. Further, the solvent used for the reaction can be easily purified and thus can be recycled, realizing the reduction of the production cost.

While the invention has been described in detail and with reference to specific embodiments thereof, it will be apparent to one skilled in the art that various changes and modifications can be made therein without departing from the spirit and scope thereof.

What is claimed is:

1. A process for producing an isobutylene polymer, which comprises mixing the following components (1) to (6) at a temperature of from −100° C. to 0° C.:

(1) a cation polymerizable monomer containing isobutylene;

(2) a compound represented by formula (I):

wherein $R^1$ represents an aromatic ring group, or a substituted or unsubstituted aliphatic hydrocarbon group; $R^2$ and $R^3$ may be the same or different and each represents a hydrogen atom, or substituted or unsubstituted monovalent hydrocarbon group, with the proviso that when $R^1$ is an aliphatic hydrocarbon group, $R^2$ and $R^3$ are not a hydrogen atom at the same time; X represents a halogen atom, a $R^4$COO— group, in which $R^4$ represents a hydrogen atom or a $C_{1-5}$ alkyl group, or a $R^5$O— group, in which $R^5$ represents a hydrogen atom or a $C_{1-5}$ alkyl group; and n represents an integer of from 1 to 8;

(3) a Lewis acid;

(4) an electron donating component having a donor number of from 15 to 50;

(5) a toluene-containing hydrocarbon solvent having a boiling point of not lower than 105° C. and a melting point of not higher than −90° C.; and (6) an allyltrimethylsilane, so as to produce a reaction product containing polyisobutylene, hexamethyldisiloxane and the hydrocarbon solvent, distilling the reaction product so as to remove the hexamethyldisiloxane therefrom as forerun, recovering the solvent from the reaction product, and reusing the solvent.

2. The process as claimed in claim 1, wherein the reaction system does not substantially contain hexamethyldisiloxane from said hydrocarbon solvent having a boiling point of not lower than 105° C. and a melting point of not higher than −90° C. when the reaction is effected in said hydrocarbon solvent.

3. A process as claimed in claim 1, wherein said toluene-containing hydrocarbon solvent having a boiling point of not lower than 105° C. and a melting point of not higher than −90° C. further contains at least one selected from the group consisting of ethylcyclohexane, 2,2,3-trimethylpentane and 2,2,5-trimethylhexane.

4. The process as claimed in claim 3, wherein said hydrocarbon solvent is a mixture of toluene and ethylcyclohexane.

5. The process as claimed in claim 4, wherein the mixing ratio of toluene and ethylcyclohexane by volume is from 8:2 to 7:3.

6. The process as claimed in claim 1, wherein said Lewis acid component is selected from the group consisting of boron trichloride, titanium tetrachloride and tin tetrachloride.

7. The process as claimed in claim 1, wherein said electron donating component is selected from the group consisting of pyridines, amines, amides and sulfoxides.

8. The process as claimed in claim 1, wherein the amount of said components (1) to (4) and (6) are each regulated to the level as defined below:

(1) the concentration of a cation polymerizable monomer containing isobutylene ranges from 0.1 to 10 mol/l;

(2) a amount of the compound represented by the formula (I) ranges from 0.01 to 20% by weight based on the weight of the cation polymerizable monomer containing isobutylene;

(3) a amount of a Lewis acid is from 0.1 to 100 times by mol as much as the compound represented by the formula (I);

(4) the amount of an electron donating component is from 0.01 to 10 times by mol as much as the compound represented by the formula (I); and (6) the amount of the allyltrimethylsilane is from 0.75 to 1.5 times by mol as much as the terminal functional group in the compound represented by the formula (I).

* * * * *